(12) United States Patent
Borland et al.

(10) Patent No.: US 6,560,240 B1
(45) Date of Patent: May 6, 2003

(54) SYSTEM-ON-A-CHIP WITH VARIABLE CLOCK RATE

(75) Inventors: David J. Borland, Austin, TX (US); Gary M. Godfrey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/148,101

(22) Filed: Sep. 4, 1998

(51) Int. Cl.[7] .............................................. H04B 7/212
(52) U.S. Cl. ...................... 370/444; 370/461; 370/462
(58) Field of Search ................................ 370/445, 446, 370/447, 451, 461, 462, 463, 391, 438, 439, 442, 443, 444

(56) References Cited

U.S. PATENT DOCUMENTS

| | | | |
|---|---|---|---|
| 4,468,734 A | | 8/1984 | Lanier et al. |
| 4,654,654 A | * | 3/1987 | Butler et al. ............. 340/825.5 |
| 5,295,140 A | * | 3/1994 | Crisler et al. ................. 370/94 |
| 5,394,389 A | | 2/1995 | Kremer |
| 5,402,423 A | * | 3/1995 | Van Kersen et al. ....... 370/85.6 |
| 5,487,167 A | | 1/1996 | Dinallo et al. |
| 5,561,669 A | * | 10/1996 | Lenney et al. ................. 370/60 |
| 5,682,484 A | | 10/1997 | Lambrecht |
| 5,754,807 A | | 5/1998 | Lambrecht et al. |
| 5,761,516 A | | 6/1998 | Rostoker et al. |
| 5,790,815 A | | 8/1998 | Swanstrom et al. |
| 5,933,607 A | * | 8/1999 | Tale et al. ................ 395/200.7 |

* cited by examiner

Primary Examiner—Alpus H. Hsu
Assistant Examiner—Thien D Tran
(74) Attorney, Agent, or Firm—Meyertons Hood Kivlin Kowert & Goetzel, P.C.; Jeffrey C. Hood

(57) ABSTRACT

A system-on-a-chip with a variable clock rate bus. The integrated circuit includes at least one bus, a clock, a plurality of modules coupled to the bus and operable to transfer and receive data on the bus, and a bus controller coupled to the bus that controls data transfers on the bus. The modules are operable to generate requests to the bus controller to perform transfers on the bus. Each request comprises an identifier which identifies one or more receiving modules, a transfer size value which specifies the amount of data to be transferred, and a timing value providing a time frame within which the requested data transfer should occur. Thee bus controller receives the requests, analyzes the timing value, and selectively adjusts the clock rate of the bus based on the timing value. The bus controller may also examine the transfer size value or a priority value, and further determine a minimum rate of transfer required to provide the bandwidth on the bus to meet the time frame within which the requested transfer should occur. The integrated circuit may further comprises a power control device coupled to or part of the bus controller, which monitors power consumption and provides power conservation information to the bus controller. The bus controller may further adjust usage of the bus in response to the power conservation information provided by the power control device. The bus may be a time division, multiple access (TDMA) bus. The bus controller may enable data transfers on the TDMA bus only during assigned time slots of assigned frequency and assigned length. The bus controller may also further adjust assignment of the TDMA bus in response to the power conservation information.

29 Claims, 7 Drawing Sheets

SYSTEM-ON-A-CHIP WITH VARIABLE CLOCK RATE

BACKGROUND OF THE INVENTION

1. Field of the Invention

This invention relates to integrated circuits in general and, more particularly, to a bus with variable bandwidth in a system-on-a-chip.

2. Description of Related Art

Computer systems have traditionally comprised a system unit or housing which comprises a plurality of electrical components comprising the computer system. A computer system typically includes a motherboard, which is configured to hold the microprocessor and memory, and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. As a result, new architectures are necessary to take advantage of this increased integration. Therefore, an improved system is desired for information transfer between a plurality of different functions or modules on a single computer chip.

SUMMARY OF THE INVENTION

The problems outlined above are in large part solved an integrated circuit including a bus with variable clock rate in a system-on-a-chip. Broadly speaking, the integrated circuit includes at least one bus, a clock with a clock rate, a plurality of modules coupled to the bus and operable to transfer and receive data on the bus, and a bus controller coupled to the bus that controls data transfers on the bus. The bus operates at the clock rate, or a fraction or multiple thereof, of the clock. One or more of the plurality of modules is operable to generate requests to the bus controller to perform transfers on the bus.

In a preferred embodiment, each of the requests to perform data transfers comprise an identifier which identifies one or more receiving modules, a transfer size value which specifies the amount of data to be transferred, and a timing value providing a time frame within which the requested data transfer should occur. In this embodiment, the bus controller receives the requests from one or more of the plurality of modules for data transfers among the plurality of modules, and, for each request, the bus controller analyzes the timing value provided with each request and selectively allocates bandwidth or adjusts the clock rate of the bus based on the timing value.

In another embodiment, the bus controller also examines the transfer size value, and further determines a minimum rate of transfer required to provide the bandwidth on the bus or a minimum clock rate for the clock required to meet the time frame within which the requested transfer should occur. The timing value may provide a definite time by which the data transfer must be completed for isochronous transfer or for guaranteed delivery. The timing value may also apply for voice, audio and/or video transfers.

In one embodiment, the integrated circuit further comprises a power control device coupled to or part of the bus controller, which monitors power consumption of the integrated circuit and provides power conservation information to the bus controller. The bus controller may further adjust usage of the bus in response to the power conservation information provided by the power control device.

In one embodiment, the bus is a time division, multiple access (TDMA) bus. The bus controller may enable data transfers on the TDMA bus only during assigned time slots of assigned frequency and assigned length. The bus controller may also further adjust assignment of the TDMA bus in response to the power conservation information. In various embodiments, the bus controller is operable to change the clock rate of the clock of the TDMA bus to conserve power in response to the power conservation information, such as slowing the clock rate of the TDMA bus to a slowest possible rate that meets the time frame of the timing value for the data transfer in response to the power conservation information. If the timing value indicates real-time or fast response, then the bus controller may assign multiple contiguous time slots to that data transfer associated with that request. Time slots may be set with any frequency and/or length, as desired.

In various embodiments, the bus controller includes, or has direct access to, a memory, which stores a schedule of the data transfers. The bus controller maintains the schedule based on the requests. The schedule includes information on time slot assignments for one or more of the plurality of modules. The bus controller examines the schedule when a new request is received and allocates unused time slots for the new request. The bus controller may adjust the schedule to allow a later request with a shorter timing value to receive an earlier time slot than previously scheduled requests. The previously scheduled requests are reassigned to later time slots, as necessary. The bus controller preferably receives multiple requests and determines time slot assignments that attempt to meet each request's time frame. In one embodiment, the bus controller examines the priority value and the timing value when the bus controller analyzes the request for the transfer.

BRIEF DESCRIPTION OF THE DRAWINGS

A better understanding of the present invention can be obtained when the following detailed description of the preferred embodiment is considered in conjunction with the following drawings, in which.

Figure 1:
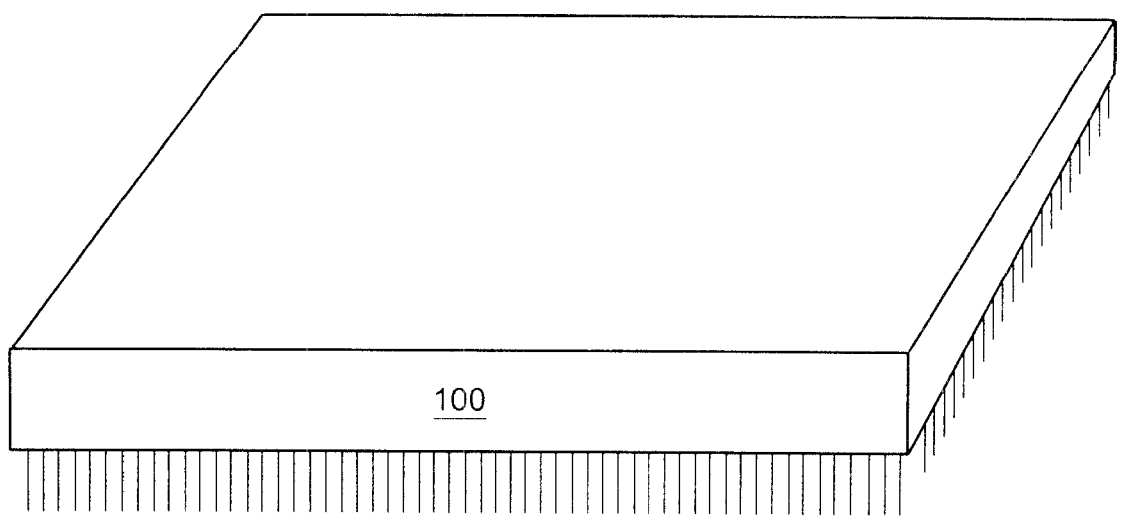
FIG. 1 illustrates a perspective view of an integrated circuit computer chip having an on-chip network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The use of a letter as part of a number designating a component of a system described in this document will be to show multiple instances of equivalent components. All figures will use a uniform numbering system with identical parts across the figures being given identical numbers.

Referring now to FIG. 1, a computer chip 100 is shown from a perspective view. Computer chip 100 preferably comprises a monolithic silicon substrate comprising a plurality of transistors. The computer chip 100 may also use gallium arsenide (GaAs) or another suitable semiconductor material; the computer chip 100 may also use optical transmission. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

In one embodiment, computer chip 100 utilizes one or more buses configured interconnect multiple modules of various types on a single computer chip 100, preferably using intelligent buffering and a universal port design. Each module is connected to a communications pathway with a full duplex, general purpose communications port, thus allowing for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIGS. 2–7.

Figure 2:
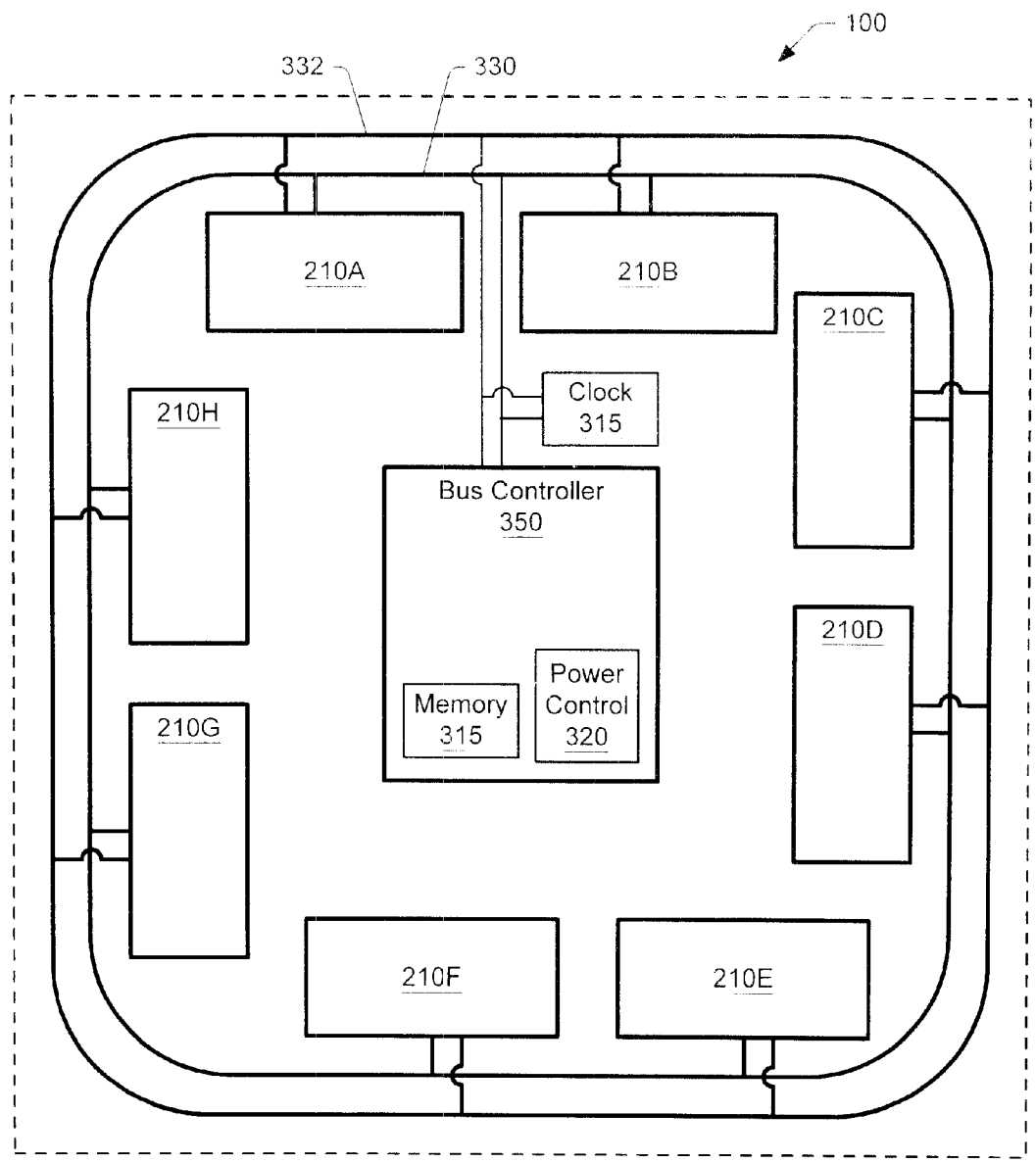
FIG. 2 illustrates an embodiment of a circular bus with variable bandwidth and a circular control bus comprised on the integrated circuit of FIG. 1, according to the present invention.

A more detailed look at an embodiment of integrated circuit 100 is shown in FIG. 2. A plurality of modules 210, labeled 210A–210H clockwise from upper left, is coupled through two circular buses, 330 and 332. The modules 210 preferably perform operations, and modules 210 may be devices such as a processor, an I/O controller, or storage (memory), or a hybrid of tasks, like a task-specific hybrid (or ASIC) or a task-general hybrid. Bus 330 is preferably a data bus 330, while bus 332 is preferably a control bus 332, but the labels "data bus" and "control bus" are interchangeable. Operations over data bus 330 and control bus 332 are controlled by bus controller 350, which is connected to data bus 330 and control bus 332 directly. In the embodiment of FIG. 2, the bus controller 350 includes a memory 315 and a power control module 320, and a clock signal is supplied to the bus controller through clock 310.

Figure 3:
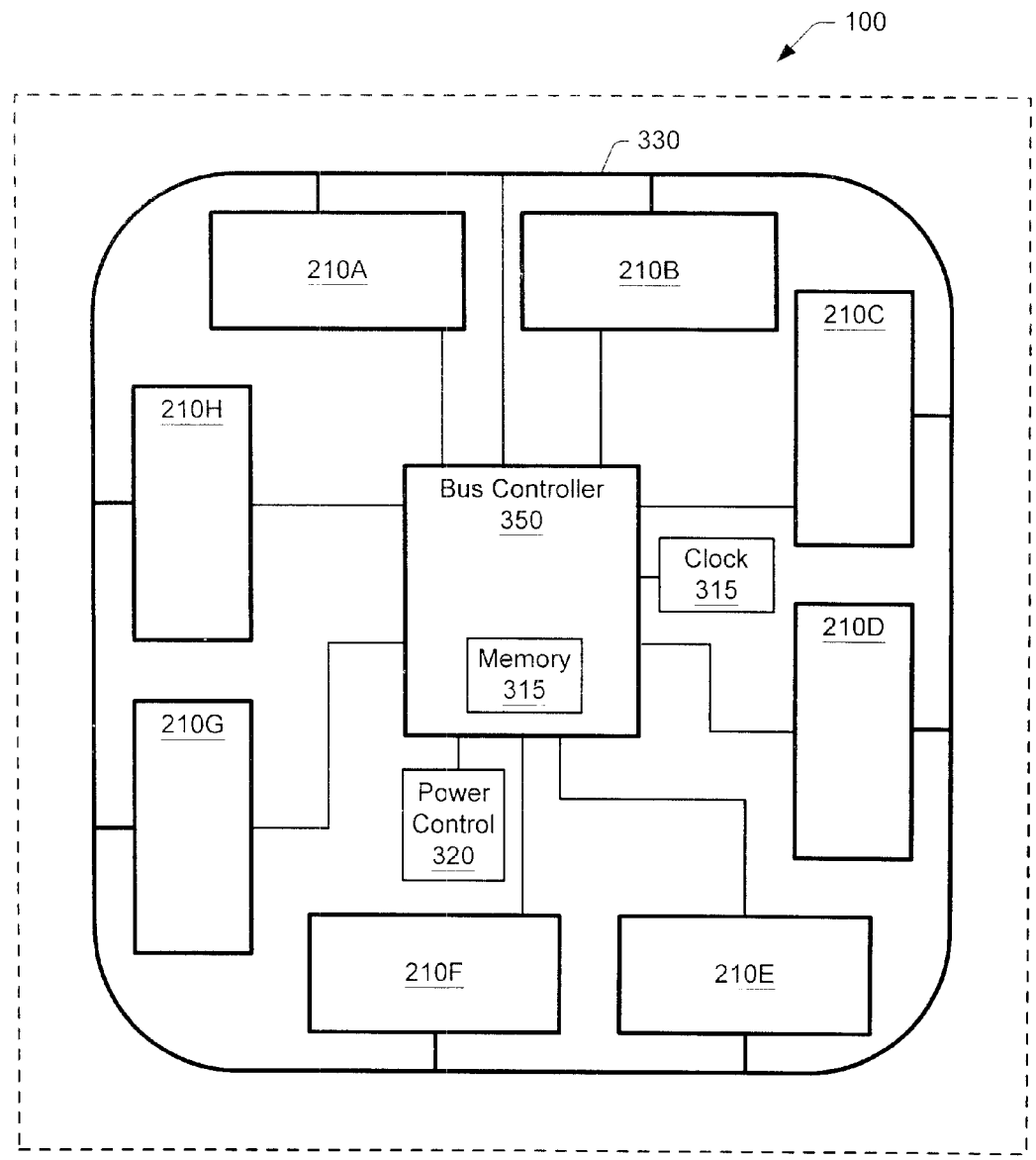
FIG. 3 illustrates an embodiment of a circular bus with variable bandwidth comprised on the integrated circuit of FIG. 1, according to the present invention.

An alternative embodiment of integrated circuit 100 is shown in FIG. 3. A plurality of modules 210, labeled 210A–210H clockwise from upper left, is coupled through a circular bus 330. The modules 210 preferably perform operations, and modules 210 may be devices such as a processor, an I/O controller, or storage (memory), or a hybrid of tasks, like a task-specific hybrid (or ASIC) or a task-general hybrid. Bus 330 is preferably a combined data, address and control bus. Operations over bus 330 are controlled by bus controller 350, which is connected to each module 210 and bus 330. In the embodiment of FIG. 2, the bus controller 350 includes a memory 315 and has a separate power control module 320 and a clock signal supplied by clock 310.

Figure 4:
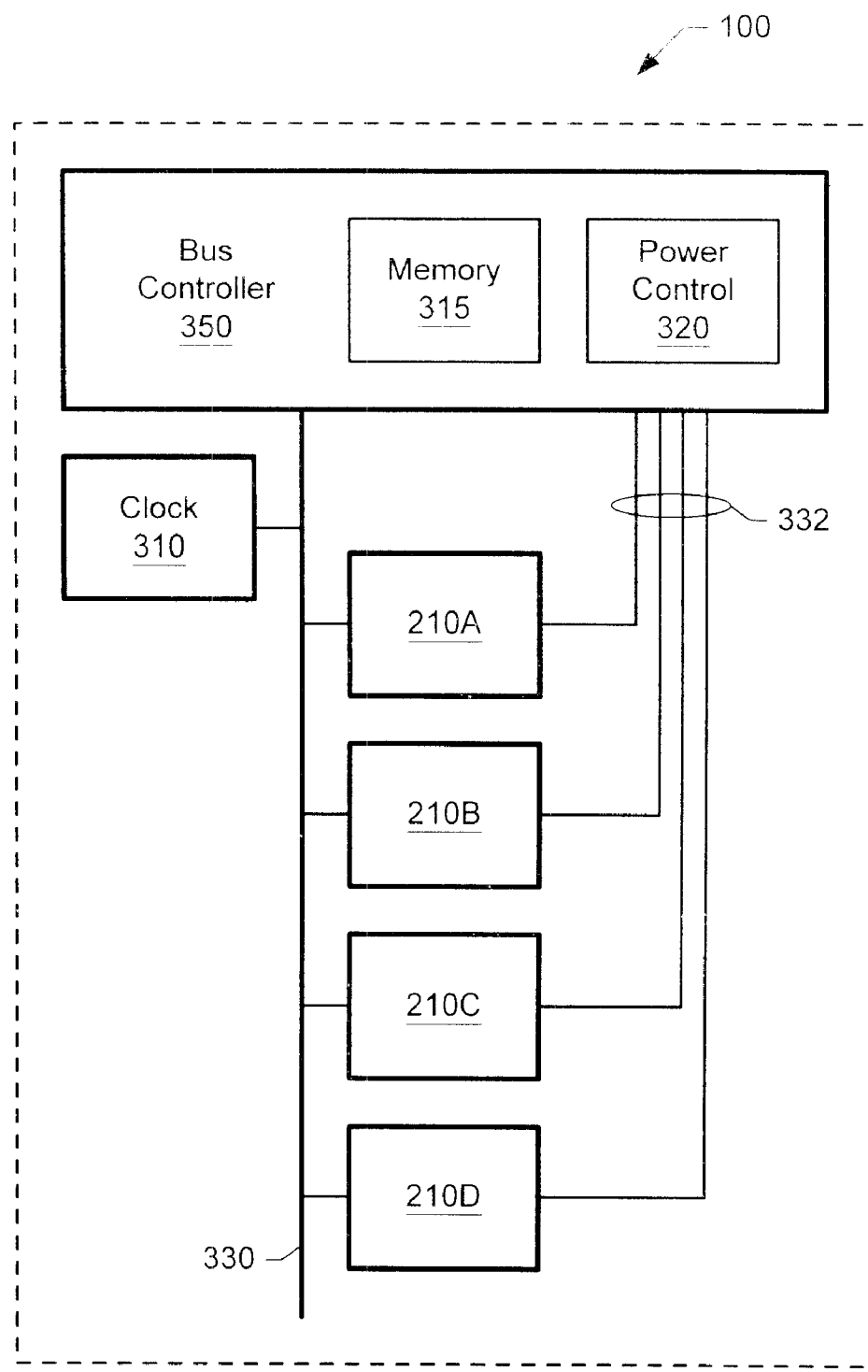
FIG. 4 illustrates an embodiment of a bus with variable bandwidth and separate control lines comprised on the integrated circuit of FIG. 1, according to the present invention.

Another embodiment of integrated circuit 100 is shown in FIG. 4. A plurality of modules 210, labeled 210A–210D clockwise from upper left, is coupled through a bus 330. The modules 210 preferably perform operations, and modules 210 may be devices such as a processor, an I/O controller, or storage (memory), or a hybrid of tasks, like a task-specific hybrid (or ASIC) or a task-general hybrid. Operations over bus 330 are controlled by bus controller 350, which is connected to each module 210 through. separate control lines, labeled collectively as control bus 332 In the embodiment of FIG. 4, the bus controller 350 includes a memory 315 and power control module 320, and a clock signal is supplied by clock 310.

Figure 5:
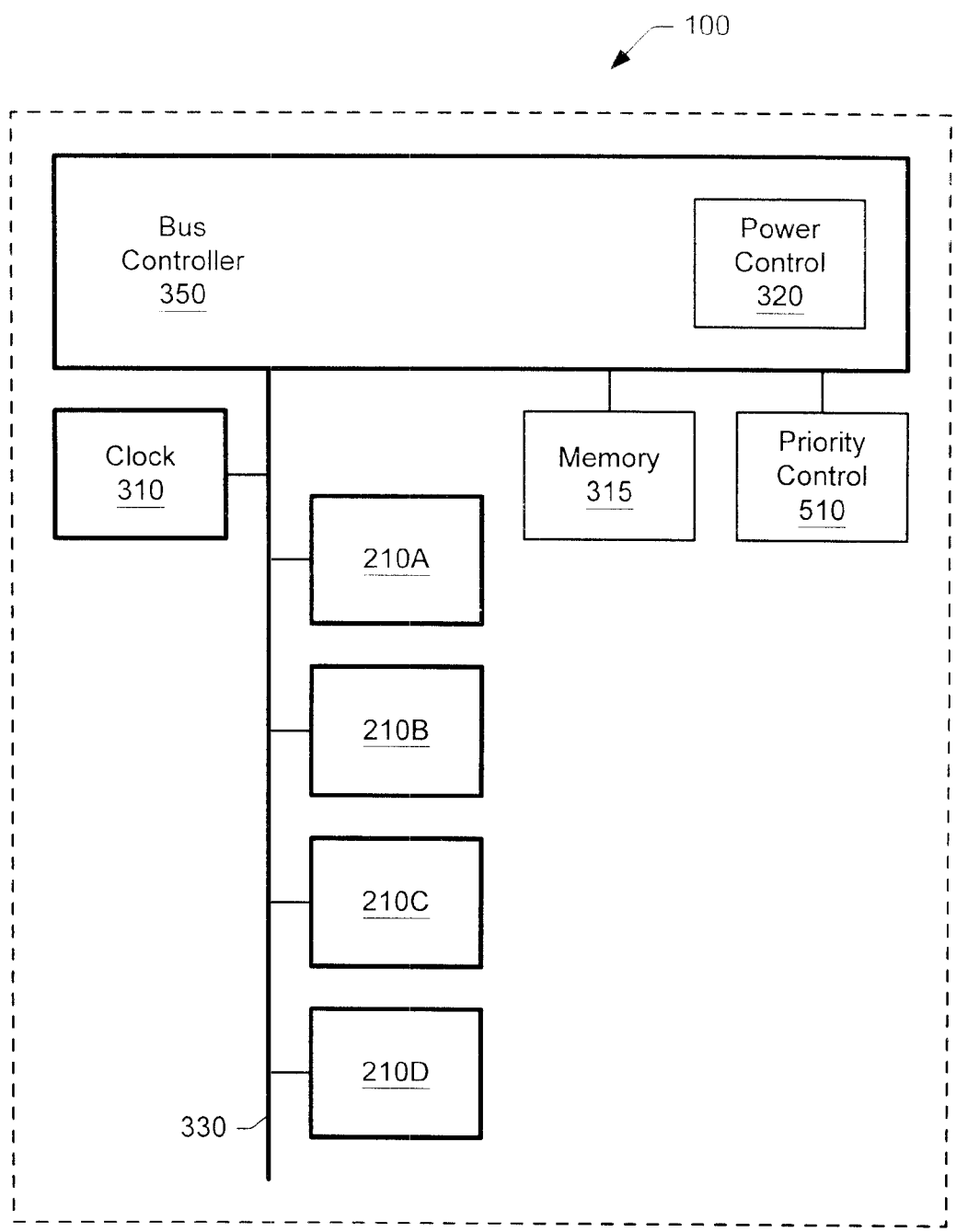
FIG. 5 illustrates an embodiment of a bus with variable bandwidth and integrated control lines comprised on the integrated circuit of FIG. 1, according to the present invention.

An alternative embodiment of integrated circuit 100 is shown in FIG. 5. A plurality of modules 210, labeled 210A–210D clockwise from upper left, is coupled through a bus 330. Bus 330 is preferably a combined data, address and control bus. The modules 210 preferably perform operations, and modules 210 may be devices such as a processor, an I/O controller, or storage (memory), or a hybrid of tasks, like a task-specific hybrid (or ASIC) or a task-general hybrid. Bus controller 350 controls operations over bus 330. In the embodiment of FIG. 5, the bus controller 350 includes a power control module 320 and a separate memory 315 and priority control unit 510. A clock signal is supplied externally by clock 310.

Figure 6:
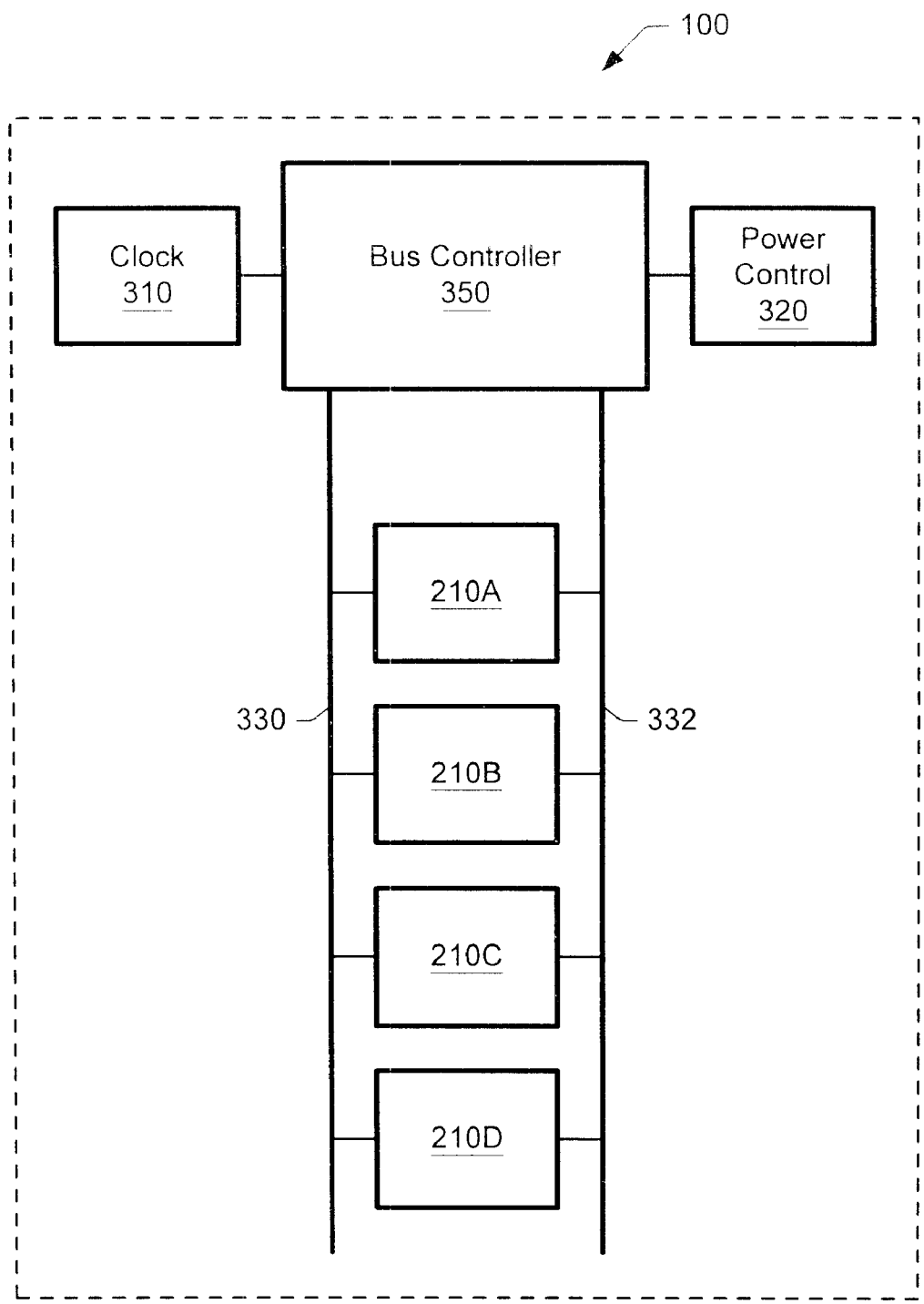
FIG. 6 illustrates an embodiment of a bus with variable bandwidth and a control bus comprised on the integrated circuit of FIG. 1, according to the present invention.

Another alternative embodiment of integrated circuit 100 is shown in FIG. 6. A plurality of modules 210, labeled 210A–210D clockwise from upper left, is coupled through buses 330 and 332. Bus 330 is preferably a data bus 330, while bus 332 is preferably a control bus 332, but the labels "data bus" and "control bus" are interchangeable. Operations over data bus 330 and control bus 332 are controlled by bus controller 350, which is connected to data bus 330 and control bus 332 directly. The modules 210 preferably perform operations, and modules 210 may be devices such as a processor, an I/O controller, or storage (memory), or a hybrid of tasks, like a task-specific hybrid (or ASIC) or a task-general hybrid. In the embodiment of FIG. 6, the bus controller 350 has a separate power control unit 310 and clock 310.

Figure 7A:
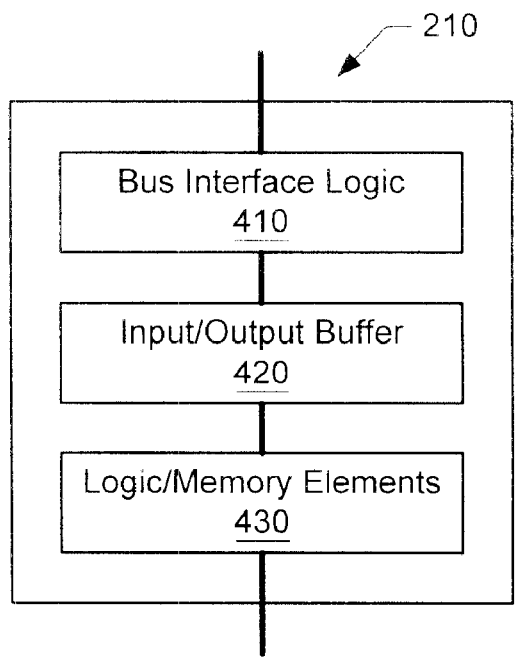
FIGS. 7A and 7B illustrate embodiments of modules that transfer data over bus with variable bandwidth, according to the present invention.
Figure 7B:
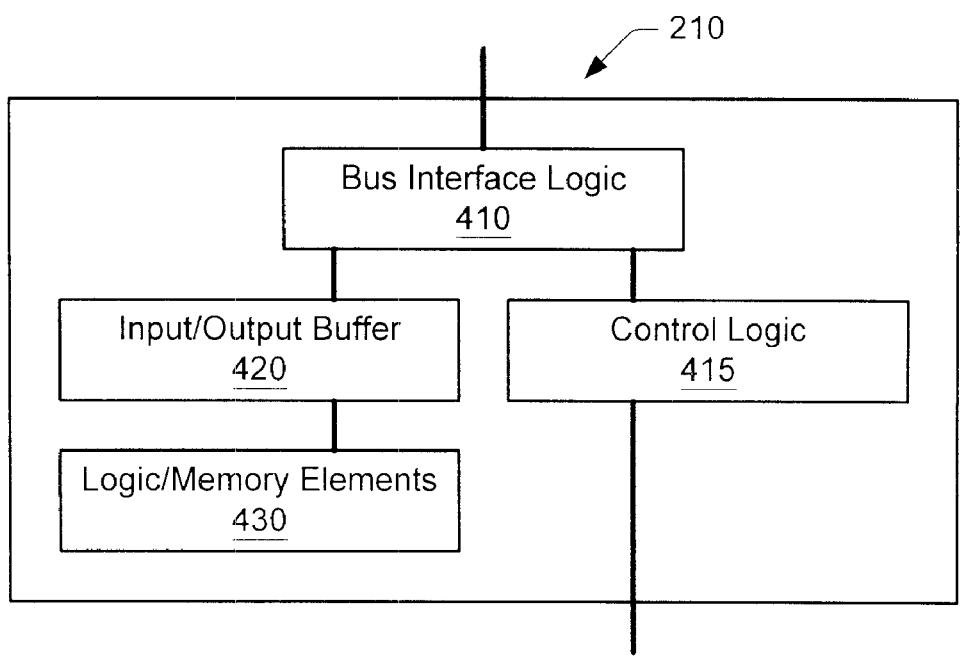

Embodiments of modules 210 are shown in FIGS. 7A and 7B. The module shown in FIG. 7A preferably connects to a unified data, address, and control bus 330. Data transferred on and off the bus 330 interface with bus interface logic 410. An optional input/output buffer 420 buffers data to and from the logic/memory elements 430 of the module 210. The module shown in FIG. 7B preferably connects to data bus 330 and control bus 332. Data transferred on and off the data bus 330 interface with bus interface logic 410. Control signals are sent through control logic 415 to the bus interface logic 410. An optional input/output buffer 420 buffers data to and from the logic/memory elements 430 of the module 210.

Common to all embodiments of the integrated circuit 100 are: at least one bus 330, a clock 310 with a clock rate, a plurality of modules 210 coupled to the bus 330 and operable to transfer and receive data on the bus 330, and a bus controller 350 coupled to the bus 330 that controls data transfers on the bus 330. The bus 330 operates at the clock rate, or a fraction or multiple thereof, of the clock 310. One or more of the plurality of modules 210 is operable to generate requests to the bus controller 350 to perform transfers on the bus 330.

In a preferred embodiment, each of the requests to perform data transfers comprise an identifier which identifies one or more receiving modules 210, a transfer size value which specifies the amount of data to be transferred, and a timing value providing a time frame within which the requested data transfer should occur. In this embodiment, the bus controller 350 receives the requests from one or more of the plurality of modules 210 for data transfers among the plurality of modules 210, and, for each request, the bus controller 350 analyzes the timing value provided with each request and selectively allocates bandwidth or adjusts the clock rate of the bus 330 based on the timing value.

In another embodiment, the bus controller 350 also examines the transfer size value, and further determines a minimum rate of transfer required to provide the bandwidth on the bus 330 or a minimum clock rate for the clock 310 required to meet the time frame within which the requested transfer should occur. The timing value may provides a definite time by which the data transfer must be completed for isochronous transfer or for guaranteed delivery. The timing value may also apply for voice, audio and/or video transfers.

In one embodiment, the integrated circuit 100 further comprises a power control device 320 coupled to or part of the bus controller 350, which monitors power consumption of the integrated circuit 100 and provides power conservation information to the bus controller 350. The bus controller 350 may further adjust usage of the bus 330 in response to the power conservation information provided by the power control device 320.

In one embodiment, the bus 330 is a time division, multiple access (TDMA) bus. The bus controller 350 may enable data transfers on the TDMA bus 330 only during assigned time slots of assigned frequency and assigned length. The bus controller 350 may also further adjust assignment of the TDMA bus 330 in response to the power conservation information. In various embodiments, the bus controller 350 is operable to change the clock rate of the clock 310 of the TDMA bus 330 to conserve power in response to the power conservation information, such as slowing the clock rate of the TDMA bus 330 to a slowest possible rate that meets the time frame of the timing value for the data transfer in response to the power conservation information. If the timing value indicates real-time or fast response, then the bus controller 350 may assign multiple contiguous time slots to that data transfer associated with that request. Time slots may be set with any frequency and/or length, as desired.

In various embodiments, the bus controller 350 includes, or has direct access to, a memory 315, which stores a schedule of the data transfers. The bus controller 350 maintains the schedule based on the requests. The schedule includes information on time slot as signments for one or more of the plurality of modules. The bus controller examines the schedule when a new request is received and allocates unused time slots for the new request. The bus controller 350 may adjust the schedule to allow a later request with a shorter timing value to receive an earlier time slot than previously scheduled requests. The previously scheduled requests are reassigned to later time slots, as necessary. The bus controller preferably receives multiple requests and determines time slot assignments that attempt to meet each request's time frame. In one embodiment, the bus controller examines the priority value and the timing value when the bus controller analyzes the request for the transfer.

In various embodiments, the integrated circuit 100 includes a unified data, address, and control bus 330, or a separate data bus 330 and control bus 332. The control bus may include one or more separate control channels coupled between the modules 210 and the bus controller 350. The bus controller communicates with the modules 210 over the one or more control channels, notifying the modules 210 of time slot assignments and changes in time slot assignments, such as in a TDMA bus 330. The one or more control channels may be physically separate from one another and the data bus 330. Buses 330 and 332 may be serial or parallel buses, as desired.

Therefore, the present invention comprises an integrated circuit with variable bandwidth between on-board modules. Although the system of the present invention has been described in connection with the preferred embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit, the integrated circuit comprising:

a bus;

a clock coupled to the bus which provides a clock signal to the bus, wherein the clock signal has a clock rate, wherein the bus operates according to the clock rate;

a plurality of modules, wherein each of the plurality of modules is coupled to said bus, wherein said each of the plurality of modules is operable to transfer data on the bus and to receive data on the bus; and a bus controller coupled to the bus which controls data transfers on the bus;

wherein one or more of the plurality of modules is operable to generate requests to the bus controller to perform transfers on the bus, wherein each of said requests to perform data transfers comprises:

an identifier which identifies one or more receiving modules;

a transfer size value which specifies the amount of data to be transferred; and a timing value providing a time frame within which the requested data transfer should occur;

wherein the bus controller receives said requests from one or more of the plurality of modules for data transfers among the plurality of modules, wherein, for each said request, the bus controller analyzes the timing value provided with said request and selectively adjusts the clock rate of the bus based on said timing value.

2. The integrated circuit of claim 1, wherein said bus controller also examines said transfer size value, wherein said bus controller further determines a minimum clock rate required to meet the time frame within which the requested transfer should occur.

3. The integrated circuit of claim 1, wherein said timing value provides a definite time by which said data transfer must be completed for isochronous transfer or for guaranteed delivery.

4. The integrated circuit of claim 3, wherein said isochronous transfer or for guaranteed delivery include voice, audio and video transfers.

5. The integrated circuit of claim 1, further comprising:
a power control device coupled to the bus controller which monitors power consumption of the integrated circuit and provides power conservation information to the bus controller;
wherein said bus controller further adjusts usage of the bus in response to the power conservation information.

6. The integrated circuit of claim 5, wherein said bus is a time division, multiple access (TDMA) bus, wherein said bus controller enables data transfers on the TDMA bus only during assigned time slots of assigned frequency and assigned length.

7. The integrated circuit of claim 6, wherein said bus controller is operable to change the clock rate of the clock of the TDMA bus to conserve power in response to the power conservation information.

8. The integrated circuit of claim 7, wherein said bus controller is operable to slow the clock rate of the TDMA bus to a slowest possible rate that meets said time frame of said timing value for the data transfer in response to the power conservation information.

9. The integrated circuit of claim 6, wherein if said timing value indicates real-time or fast response, then said bus controller assigns multiple contiguous time slots to said data transfer associated with said request.

10. The integrated circuit of claim 6, wherein said bus controller includes a memory which stores a schedule of said data transfers, wherein said bus controller maintains the schedule based on said requests, wherein the schedule includes information on time slot assignments for said plurality of modules;
wherein said bus controller examines the schedule when a new request is received and allocates unused time slots for the new request.

11. The integrated circuit of claim 10, wherein said bus controller adjusts said schedule to allow a later request with a shorter timing value to receive an earlier time slot than previously scheduled requests, wherein the previously scheduled requests are reassigned to later time slots.

12. The integrated circuit of claim 6, wherein said bus controller receives multiple requests and determines time slot assignments which attempt to meet each request's time frame.

13. The integrated circuit of claim 12, wherein said bus controller examines said priority value and said timing value when said bus controller analyzes said request.

14. The integrated circuit of claim 13, wherein said bus controller receives multiple requests and determines time slot assignments which meet each request's time frame.

15. The integrated circuit of claim 6, further comprising:
one or more control channels coupled between said modules and said bus controller;
wherein said bus controller communicates with said modules over the one or more control channels, wherein said communicates includes notification of time slot assignments and changes in time slot assignments.

16. The integrated circuit of claim 15, wherein said one or more control channels and said bus are integrated into a single bus.

17. The integrated circuit of claim 15, wherein said one or more control channels are integrated into a control bus.

18. The integrated circuit of claim 15, wherein said one or more control channels are physically separate from one another and said bus.

19. The integrated circuit of claim 1, wherein said bus is a serial bus.

20. The integrated circuit of claim 1, wherein said bus is a parallel bus.

21. An integrated circuit, the integrated circuit comprising:
a bus;
a clock coupled to the bus which provides a clock signal to the bus, wherein the clock signal has a clock rate, wherein the bus operates according to the clock rate;
a plurality of modules, wherein each of the plurality of modules is coupled to the bus, wherein said each of the plurality of modules is operable to transfer data on the bus and to receive data on the bus; and
a bus controller coupled to the bus which controls data transfers on the bus;
wherein the plurality of modules are operable to generate requests to perform data transfers on the bus to the bus controller, wherein each of the requests to perform data transfers comprises:
an identifier which identifies one or more receiving modules;
a transfer size value which specifies the amount of data to be transferred;
a timing value providing a time frame within which the requested data transfer should occur; and
a priority value for the requested data transfer;
wherein the bus controller receives the requests to perform data transfers from the plurality of modules, wherein, for each said request, the bus controller examines the timing value and the priority value provided with said request and selectively adjusts the clock rate of the bus based on the timing value and the priority value.

22. The integrated circuit of claim 21, wherein said bus controller also examines said transfer size value, wherein said bus controller further determines a minimum rate of transfer required to provide said bandwidth on the bus.

23. The integrated circuit of claim 21, wherein said timing value provides a specific time by which said data transfer must be completed for isochronous transfer.

24. The integrated circuit of claim 21, wherein said bus is a time division, multiple access (TDMA) bus, wherein said bus controller enables data transfers on the TDMA bus only during assigned time slots of assigned frequency and assigned length.

25. The integrated circuit of claim 24, wherein if said timing value indicates real-time or fast response, then said bus controller assigns multiple contiguous time slots to said data transfer associated with said request.

26. The integrated circuit of claim 24, wherein said bus controller includes a memory which stores a schedule of said data transfers, wherein said bus controller maintains the schedule based on said requests, wherein the schedule includes information on time slot assignments for said plurality of modules;

wherein said bus controller examines the schedule when a new request is received and allocates unused time slots for the new request.

27. The integrated circuit of claim 26, wherein said bus controller adjusts said schedule to allow a later request with a shorter timing value to receive an earlier time slot than previously scheduled requests, wherein the previously scheduled requests are reassigned to later time slots.

28. The integrated circuit of claim 24, wherein said bus controller receives multiple requests and determines time slot assignments which attempt to meet each request's time frame.

29. The integrated circuit of claim 24, further comprising:

one or more control channels coupled between said modules and said bus controller;

wherein said bus controller communicates with said modules over the one or more control channels, wherein said communicates includes notification of time slot assignments and changes in time slot assignments.

* * * * *